Patented Sept. 17, 1935

2,014,568

UNITED STATES PATENT OFFICE 2,014,568

VAT DYESTUFFS OF THE ANTHRAQUINONE-ACRIDINE SERIES AND THEIR PRODUCTION

Ernst Honold, Frankfort-on-the-Main, and Hugo Wolff, Mannheim, Germany, assignors to General Aniline Works, Inc., New York, N. Y., a corporation of Delaware No Drawing. Application September 11, 1930, Serial No. 481,344. In Germany October 12, 1929

8 Claims. (Cl. 260—36)

The present invention relates to new vat dyestuffs of the benzanthrone series and process of producing the same.

A process for the manufacture and production of vat dyestuffs is described in the U. S. Patent No. 995,936 according to which benzanthronyl-1-aminoanthraquinone or its derivatives are treated with alkaline condensing agents. These products probably correspond to the general formula:

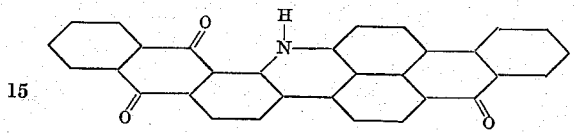

We have now found that by condensing halogen derivatives of the aforesaid condensation products with nitrogenous organic compounds which contain at least one replaceable hydrogen atom attached to a nitrogen atom, new valuable vat dyestuffs are obtained. The new vat dyestuffs differ substantially from the products obtained according to the said U. S. Patent No. 995,936. The alteration in the shade of color depends, generally speaking, on the number and kind of radicles introduced into the dyestuff molecule. Thus for example by the introduction of an aminoanthraquinonyl radicle into the molecule of the dyestuffs of the U. S. Patent No. 995,936 the green shade of color of these dyestuffs is changed to yellow. Moreover, generally speaking, the properties as regards fastness, as for example the fastness to bucking, are substantially improved.

The introduction of halogen into the dyestuffs obtained according to the said Patent No. 995,936 may be effected in a great variety of ways. Thus the dyestuffs may be treated with halogens or agents which split off halogens either in a solvent or diluent as for example sulphuric acid or nitrobenzene or in the absence of any solvent. Halogen derivatives of the dyestuffs of the kind described in the said patent may also be obtained by subjecting halogenbenzanthronylamino-anthraquinones such as are formed for example by condensation of halogen-Bzl-brombenzanthrones with 1 molecular proportion of 1-amino-anthraquinone or its derivatives under mild conditions to alkaline condensation. For the condensation preferably such halogen derivatives of the said kind are employed as contain between 1 and 4 halogen atoms.

Nitrogenous organic compounds containing a reaction hydrogen atom attached to a nitrogen atom which may be used for the purpose of the present invention, comprise, for example, organic amines, in particular amino derivatives of organic compounds which are capable of being vatted, especially amino derivatives of anthraquinone and its derivatives.

The condensation is preferably carried out in organic diluents, such as for example nitrobenzene and naphthalene, and in the presence of acid-binding agents and copper or copper compounds.

If desired, the new dyestuffs may be subjected to a further treatment with acid condensing agents, and in this manner a change in shade takes place.

The following examples will further illustrate the nature of this invention, but the invention is not restricted to these examples. The parts are by weight.

Example 1

10 parts of the dyestuff obtainable according to Example 1 of the said Patent No. 995,936 are introduced while cooling into 120 parts of bromine, the whole being then allowed to stand for about 24 hours at ordinary temperature. The reaction mixture is then diluted with glacial acetic acid, and the brominated dyestuff is filtered off by suction, washed and dried. It is a dark green powder which dissolves in concentrated sulphuric acid giving a green coloration and according to analysis is a mixture of a di- and tri-brominated substance. Dyestuffs containing more bromine may be obtained by causing the bromine to act for longer periods of time.

10 parts of the brominated dyestuff thus obtained are heated to boiling with 8 parts of 1-aminoanthraquinone, 6 parts of calcined soda, 0.5 part of copper oxide and 200 parts of nitrobenzene until the conversion is completed. After cooling, the reaction product is filtered off by suction, washed and dried. The resulting dyestuff probably is substantially a compound of the formula

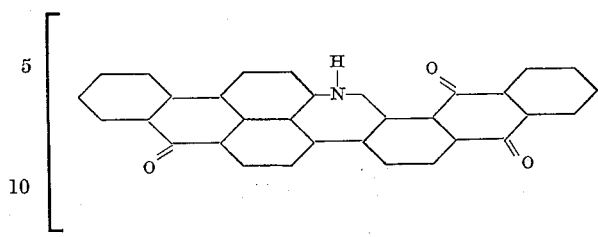

it contains some bromine and is a black powder which dissolves in concentrated sulphuric acid giving a blue green coloration, and yields a red brown vat with caustic soda and hydrosulphite from which the vegetable fibre is dyed very fast brown olive shades.

By condensing dyestuffs which have been brominated by other methods, with 1-aminoanthraquinone in an analogous manner similar dyestuffs are obtained which vary in shade more towards green or yellow according to the method of preparation of the brominated initial dyestuff.

*Example 2*

100 parts of the green dyestuff obtainable according to Example 1 of the said Patent No. 995,936 are suspended in a very finely divided form in 5000 parts of water and 100 parts of bromine are added at ordinary temperature. This reaction mixture is stirred for some hours at from about 20° to 30° C., the temperature then being raised to from 50° to 55° C. and maintained at that temperature for some time while stirring. In order to complete the bromination the temperature is raised to from 90° to 95° C. and the whole is stirred at this temperature for from 2 to 3 hours. The reaction product is then filtered while hot, washed and dried. The brominated dyestuff is a dark green powder which dissolves in concentrated sulphuric acid giving a green coloration.

8 parts of the brominated dyestuff probably containing between 1 and 2 atoms of bromine per molecule, are boiled with 6 parts of 1-aminoanthraquinone, 4 parts of calcined soda, 0.3 part of copper oxide and 150 parts of naphthalene until unchanged initial material can no longer be detected. After cooling the reaction mixture to about 100° C. 150 parts of xylene are added. The mixture is filtered while still hot and the reaction product washed with warm xylene. The new dyestuff is a dark powder which dissolves in concentrated sulphuric acid giving a green coloration and which dyes the vegetable fibre fast brown olive colored shades from a brown vat. Probably the product is substantially a compound of the formula

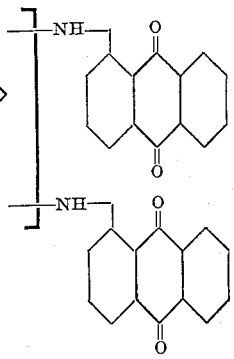

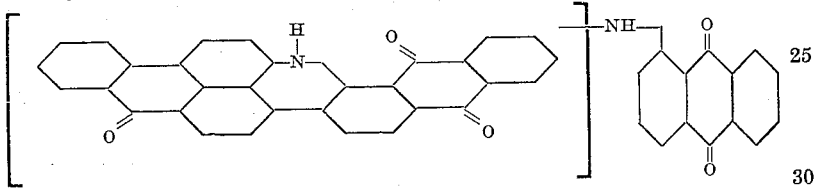

*Example 3*

10 parts of the dyestuff obtained according to Example 2 are heated for about 1 hour to from 120° to 125° C. with 100 parts of concentrated sulphuric acid. When the reaction is completed the reaction mixture is poured into water. The whole is boiled, filtered and the reaction product washed with hot water until neutral. The resulting dyestuff is a green black paste which gives a violet brown vat with caustic soda and hydrosulphite from which the vegetable fibre is dyed olive green shades having good properties as regards fastness. The dyestuff dissolves in concentrated sulphuric acid giving a blue green coloration.

*Example 4*

10 parts of the dyestuff containing chlorine (obtainable by the alcoholic potash melt under mild conditions of 1'-anthraquinonyl-Bzl-amino-6-chlorbenzanthrone which may be obtained by condensing Bzl-bromo-6-chlorobenzanthrone with 1-aminoanthraquinone in nitrobenzene at about 130° C.) are heated to boiling while stirring with 7.5 parts of 1-amino-5-benzoylaminoanthraquinone, 10 parts of finely ground potash, 0.6 part of cuprous chloride and 250 parts of nitrobenzene until the conversion is completed. After cooling to 80° C., the melt is diluted with 250 parts of ethyl alcohol, filtered while hot and the residue washed with alcohol and water. The dyestuff thus obtained is a green black powder dissolving in concentrated sulphuric acid to give an olive green solution and dyes the vegetable fibre fast olive green shades from a violet blue vat. Probably the product is substantially a compound of the formula

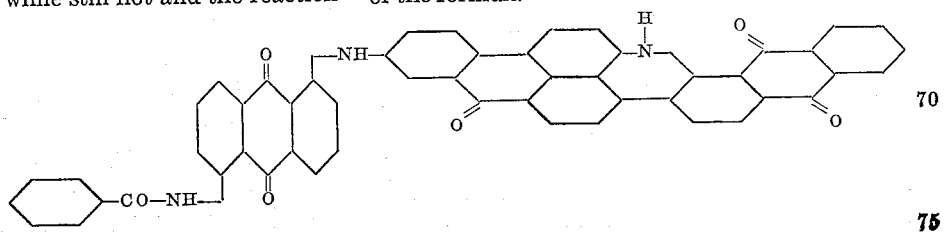

Example 5

10 parts of the green dyestuff obtainable according to Example 1 of the Patent No. 995,936 are heated to boiling for about 5 hours with 150 parts of trichlorobenzene, 0.2 part of iodine and 20 parts of sulphur chloride. After cooling, the chlorinated dyestuff is filtered off, washed and dried. It is a dark green powder which according to analysis is a mixture of di- and trichloro derivatives.

8 parts of the chlorinated product are heated to boiling with 8 parts of aminodibenzanthrone, 6 parts of sodium carbonate, 0.6 part of copper oxide and 300 parts of nitrobenzene until unchanged aminodibenzanthrone cannot any more be detected which is the case after about 20 hours. The cooled melt is filtered and worked up as usual. The condensation product is obtained in the form of a black powder dissolving in concentrated sulphuric acid and gives a red violet solution. When reprecipitated from its sulphuric acid solution the dyestuff is obtained in the form of a black paste dyeing the vegetable fibre from gray to black shades from a blue vat.

Example 6

6.5 parts of the brominated dyestuff obtained according to Example 2 are heated to boiling for several hours with 5 parts of 4-amino-2'.4'-dichloroanthraquinone - 2.1(N) - benzacridone, 8 parts of anhydrous sodium acetate, 0.5 part of anhydrous copper acetate in 200 parts of nitrobenzene until the conversion is completed. The melt cooled to 80° C. is diluted with 200 parts of alcohol, filtered while hot, and worked up in the usual manner. The dyestuff thus obtained is a dark blue green powder dissolving in concentrated sulphuric acid to give a bottle green solution. On pouring this solution into water a green black paste is obtained dyeing the vegetable fibre olive green shades from a currant vat. Probably the product is substantially a compound of the formula

Example 7

5.8 parts of the brominated dyestuff obtainable as described in Example 2 are heated to boiling for about 10 to 12 hours with 5 parts of 5.5'-diamino-1.1'-dianthrimide-carbazol, 3 parts of sodium carbonate, 0.3 part of copper oxide in 150 parts of nitrobenzene. On working up the reaction mixture in the usual manner the dyestuff is obtained as a brown black powder dissolving in concentrated sulphuric acid to give a green solution and dyeing the vegetable fibre fast coffee brown shades from a brown vat. Probably the product is formed by -NH- linkages between the two following ring systems

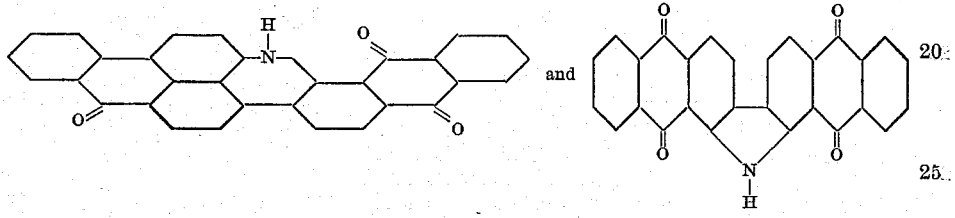

Other diamino-1.1'-dianthrimidecarbazols or their monobenzoyl compounds may be condensed with the brominated dyestuff employed in the foregoing paragraph. Moreover, both amino groups of the said diamino compounds may be brought into reaction with the said brominated dyestuff, brown to gray green dyestuffs being obtained.

Example 8

10 parts of the brominated dyestuff employed according to Example 2 are heated to boiling while stirring in an oil bath with 6.5 parts of 1-amino-4-benzoylaminoanthraquinone, 6 parts of calcined soda, 0.3 part of copper oxide and 150 parts of nitrobenzene until the conversion is complete. After cooling to 80° C., the reaction mixture is diluted with 150 parts of alcohol, whereupon the precipitate is filtered off from the warm solution, washed with alcohol and water. The new dyestuff is a black powder which dissolves in concentrated sulphuric acid to give a bottle green solution, and dyes cotton fast olive green shades from a brown vat having a violet

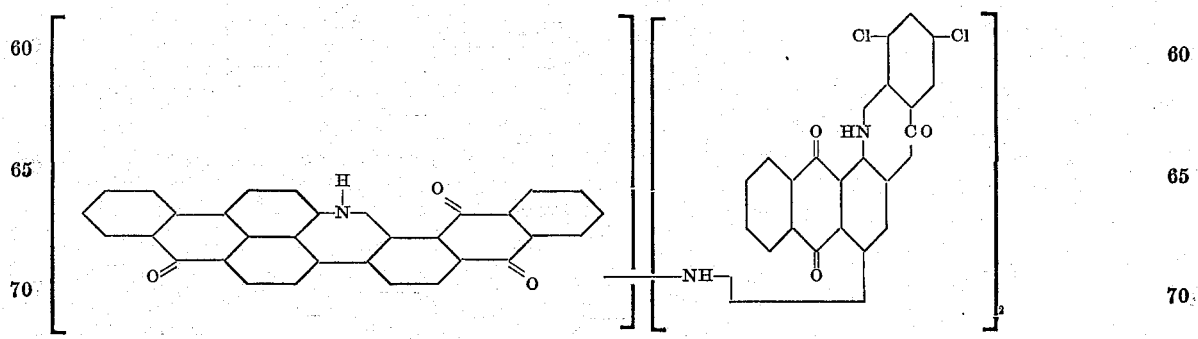

tinge. Probably the product is substantially a compound of the formula

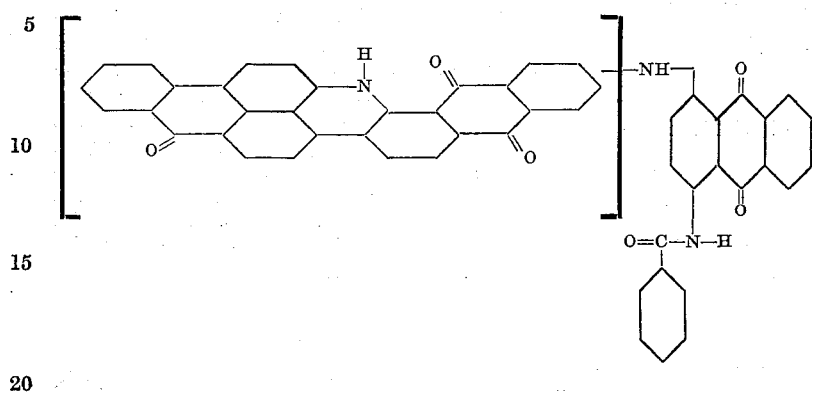

Example 9

10 parts of the brominated dyestuff employed according to Example 2 are heated to boiling with 6.5 parts of 1-amino-5-benzoylaminoanthraquinone, 6 parts of calcined soda, 0.3 part of copper oxide and 150 parts of naphthalene until unchanged initial material cannot anymore be detected. The melt is allowed to cool to about 80° C., diluted with 150 parts of xylene, filtered while warm and the filter cake washed with warm xylene. The new dyestuff is a black powder dissolving in concentrated sulphuric acid to give a green solution and dyes cotton from a brown vat fast olive brown shades. Probably the product is substantially a compound of the formula

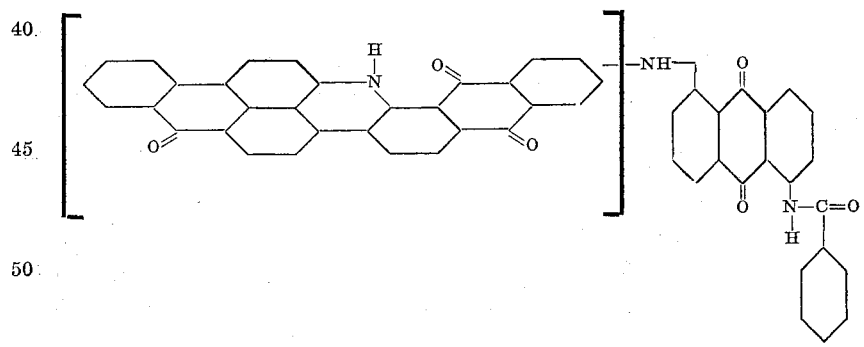

What we claim is:—

1. A process of producing vat dyestuffs of the benzanthrone series, which comprises condensing a halogen derivative of a compound corresponding to the general formula:

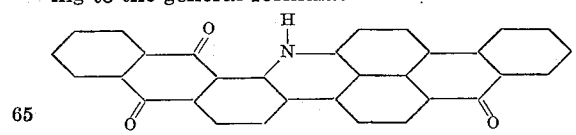

with a primary aromatic amine.

2. A process of producing vat dyestuffs of the benzanthrone series, which comprises condensing a halogen derivative of a compound corresponding to the general formula:

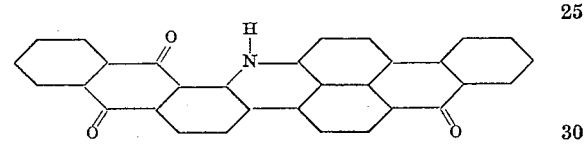

with a primary aromatic amine capable of being vatted.

3. A process of producing vat dyestuffs of the benzanthrone series, which comprises condensing a halogen derivative of a compound corresponding to the general formula:

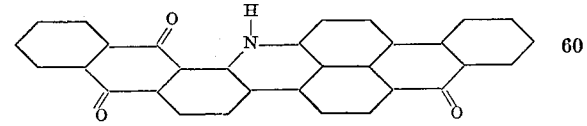

with an amino derivative of an anthraquinone.

4. Vat dyestuffs of the benzanthrone series corresponding to the general formula:

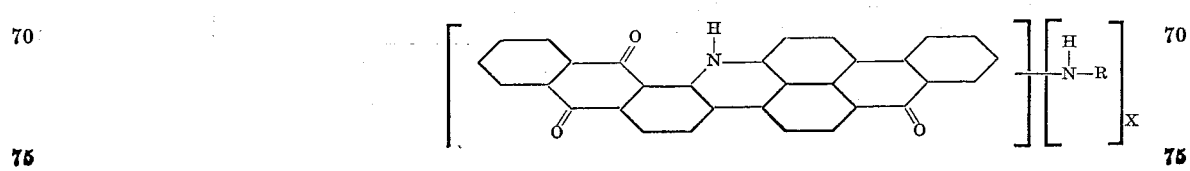

in which R stands for an aromatic radicle and $x$ is a number from 1 to 4.

5. Vat dyestuffs of the benzanthrone series corresponding to the general formula:

in which R stands for a radicle of an aromatic compound capable of being vatted and $x$ is a number from 1 to 4.

6. The vat dyestuff which consists substantially of a compound of the formula:

which may contain some halogen, dissolving in concentrated sulphuric acid to give a green solution and dyeing cotton from a brown vat fast brown olive shades.

7. The vat dyestuff which consists substantially of a compound of the formula:

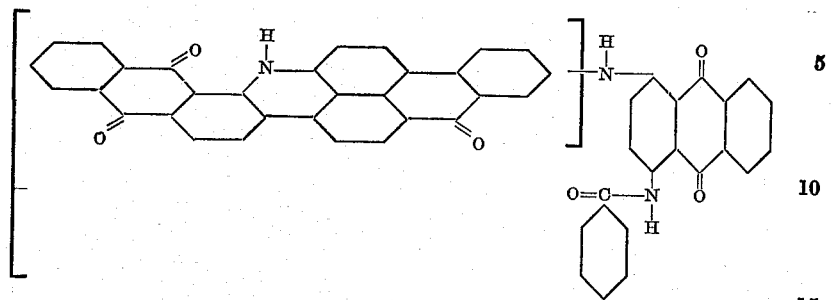

which may contain some halogen, forming a black powder, dissolving in concentrated sulphuric acid to give a bottle green solution and dyeing cotton from a brown vat with a violet tinge fast olive green shades.

8. The vat dyestuff which consists substantially of a compound of the formula:

which may contain some halogen, forming a black powder, dissolving in concentrated sulphuric acid to give a green solution and dyeing cotton from a brown vat fast olive brown shades.

ERNST HONOLD.
HUGO WOLFF.